United States Patent
Alassoeur et al.

[11] Patent Number: 6,098,401
[45] Date of Patent: Aug. 8, 2000

[54] AFTERBURNER FLAME HOLDER WITH ROTATIONALLY-SPLITTING RADIAL ARMS

[75] Inventors: Philippe Louis André Alassoeur, Olivet; Xavier Jean Michel André Guyonnet, St Fargeau Ponthierry; Pascal Michel Daniel Le Jeune, Samoreau, all of France

[73] Assignee: Societe Nationale d'Etude et de Construction de Moteurs d'Aviation "Snecma", Paris, France

[21] Appl. No.: 09/081,281

[22] Filed: May 20, 1998

[30] Foreign Application Priority Data

May 22, 1997 [FR] France .................................. 97 06233

[51] Int. Cl.[7] ........................................................ F02K 3/10
[52] U.S. Cl. .................................................................. 60/261
[58] Field of Search .................................................... 60/261

[56] References Cited

U.S. PATENT DOCUMENTS 4,335,573  6/1982  Wright .
4,686,826  8/1987  Koshoffer et al. .

FOREIGN PATENT DOCUMENTS 0 315 486   5/1989   European Pat. Off. .

*Primary Examiner*—Timothy S. Thorpe
*Assistant Examiner*—Ehud Gartenberg
*Attorney, Agent, or Firm*—Oblon, Spivak, McClelland, Maier & Neustadt, P.C.

[57] ABSTRACT

An afterburn device for a turbojet engine comprises a flame arrester formed by a plurality of radial arms distributed evenly around the rotational axis of the engine at the upstream end of the afterburn chamber. Each arm consists of a fixed rear part, and a front part which is separable from the rear part in a circumferential direction along a median joint plane, the front parts being carried on a ring which is rotatably mounted on the outer casing of the engine. Drive means is provided for rotating the ring between a first position for dry operation, and a second position for afterburn operation. In the first position the front and rear parts of the arms are aligned and joined to provide the arms with a streamlined, low-drag, zero angle of incidence profile suitable for dry operation. In the second position the front parts of the arms are separated circumferentially from the rear parts so as to alternate with the rear parts, the front and rear parts creating turbulence which acts to arrest the flame during afterburn operation.

7 Claims, 7 Drawing Sheets

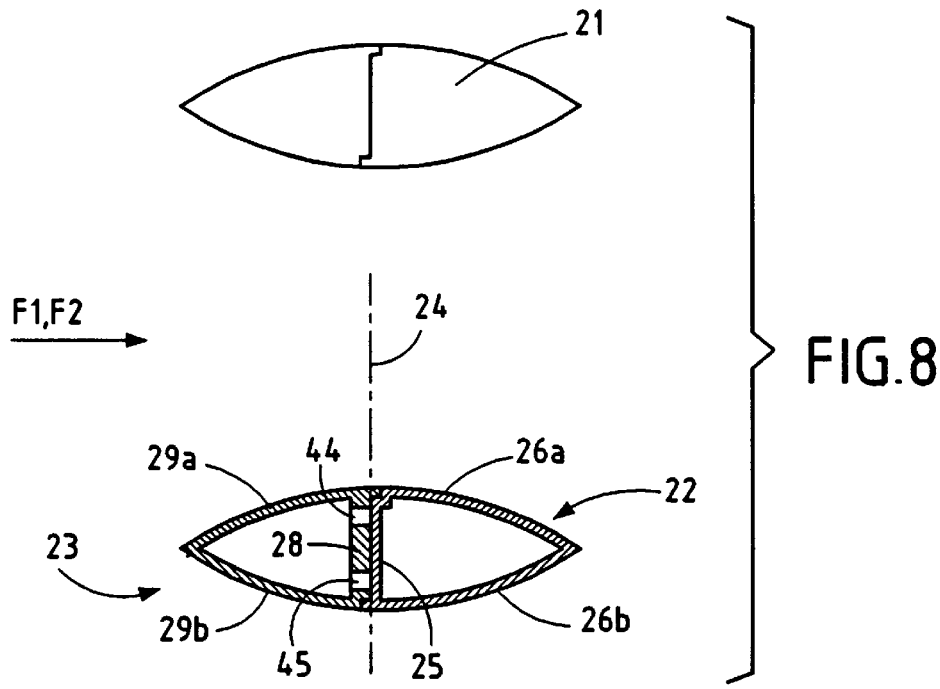
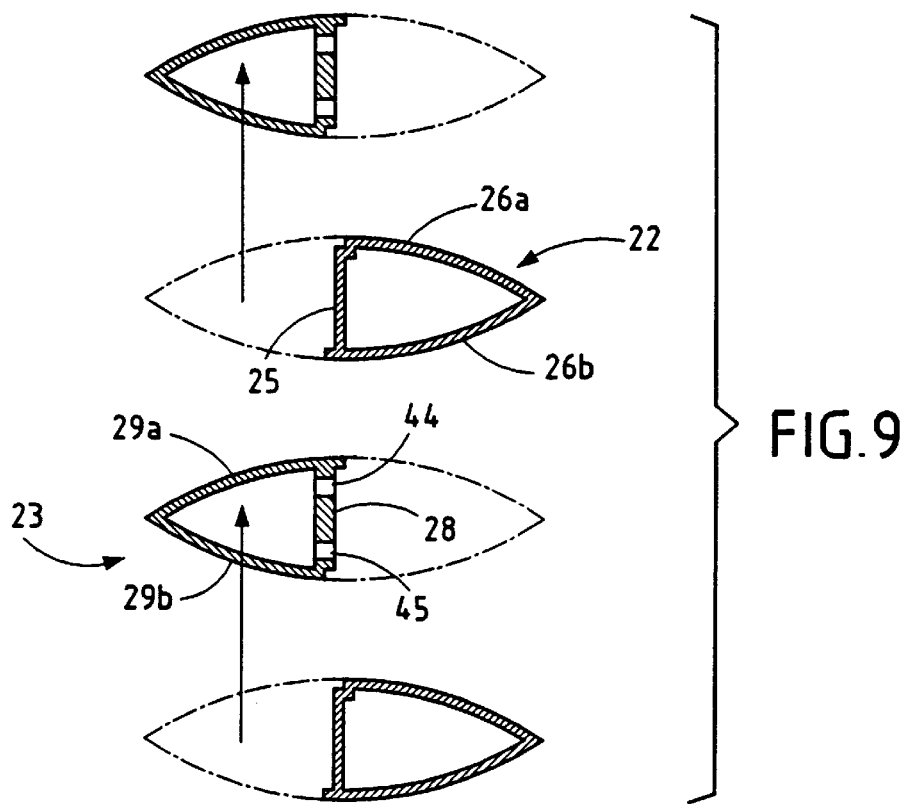

AFTERBURNER FLAME HOLDER WITH ROTATIONALLY-SPLITTING RADIAL ARMS

BACKGROUND OF THE INVENTION

The invention relates to bypass turbojet engines such as are used for military aircraft and which have an afterburn or reheat chamber which acts as a second combustion chamber.

This second combustion chamber enables a second injection of heat to be made into the combustion gases between the time when they issue from the turbine stages of the engine and the time when they are ejected from the exhaust nozzle. This help to increase the gas ejection velocity and increase engine thrust. The gases from the secondary (or bypass) flow serve to cool the afterburn chamber and supply unburnt oxidant thereto.

Afterburn systems comprise fuel injectors and devices known as flame arresters which take the form, for example, of radial arms. These arms serve to stabilise the flame in the gas flow leaving the gas generator, the flame being arrested by the creation of an air recirculation zone using a turbulence-generating obstacle.

The flame arrester arms are essential for afterburn or reheat operation, but are useless and even detrimental during non-afterburn or "dry" operation since they cause energy losses and reduce engine efficiency.

SUMMARY OF THE INVENTION

It is an object of the invention to provide an afterburn device with a simple flame stabilisation system which exhibits very low drag during dry operation and which, during afterburn operation, can produce turbulence aerodynamically in the afterburn chamber.

To this end, the invention provides an afterburn device for a bypass turbojet engine defining a longitudinal axis of revolution and including an outer first wall disposed coaxially about said axis, an inner second wall which is also disposed coaxially about said axis and which together with said first wall defines an annular outer enclosure forming a secondary air flow duct, and an inner exhaust enclosure disposed inwardly of said second wall and separated thereby from said outer enclosure, said inner exhaust enclosure forming an exhaust duct for the escape of gases from the turbine stages of said engine, said afterburn device comprising a third wall disposed axially downstream of said first wall and said second wall to define an afterburn chamber which forms a downstream axial extension of said outer enclosure and said inner exhaust enclosure, and flame arrester means disposed between said afterburn chamber and said inner and outer enclosures, said flame arrester means comprising a plurality of substantially radial arms distributed evenly around said axis, each arm having a fixed rear part and a front part which is separable from said rear part along a median joint plane substantially perpendicular to said axis, a rotatable ring mounted for rotation about said axis at the downstream end of said first wall and to which the front parts of said arms are fixed, and drive means for rotating said ring about said axis between a first position, for dry operation, in which said front parts are joined with the rear parts of said arms and combine with said rear parts to provide said arms with streamlined profiles having low drag and zero angle of incidence, and a second position, for afterburn operation, in which said front parts are separated from said rear parts and alternate therewith circumferentially about said axis.

Preferably, the front parts and the rear parts of the arms are hollow and comprise cooling systems for the flow of air from the secondary air flow duct.

In a preferred embodiment the cooling system of each front part includes a first orifice in the upstream leading edge of said front part facing said outer enclosure, and said cooling system of each rear part includes a second orifice in its front wall facing towards said outer enclosure, the rear wall of each front part being provided with a gauged third orifice which registers with the second orifice in the corresponding rear part in order to supply said rear part with a portion of the cooling flow entering said front part when said rotatable ring is in said first position.

The cross-section of the second orifice is preferably greater than the cross-section of the third orifice in order to increase the cooling flow in the rear parts during reheat operation relative to the flow during dry operation.

Preferably closure strips are provided for closing the third orifices of the front parts when the rotatable ring is in the second position.

The rear wall of each front part is preferably provided with a plurality of further orifices for the escape of cooling air, said further orifices being closed by said front wall of the corresponding rear part when said rotatable ring is in said first position.

The drive means for the rotatable ring may comprise at least one double-acting ram mounted on said first wall and having a piston rod extending through said ram, rollers at the opposite ends of said piston rod, a cable which extends around said rollers and has its opposite ends secured to said first wall, a plurality of guide pulleys mounted on said first wall and around which said cable also extends so that a portion of said cable runs substantially parallel to a tangent to said rotatable ring, and a lug connecting said portion of said cable to said ring. other preferred features of the invention will become apparent from the following description of the preferred embodiment, given by way of example only, with reference to the accompanying drawings.

BRIEF DESCRIPTION OF THE DRAWINGS

FIG. 8 is a cross-sectional view of a flame arrester arm during dry operation;

FIG. 9 is a cross-sectional view of the separated front and rear parts of two adjacent flame arrester arms during afterburn operation.

DESCRIPTION OF THE PREFERRED EMBODIMENTS

Figure 1:
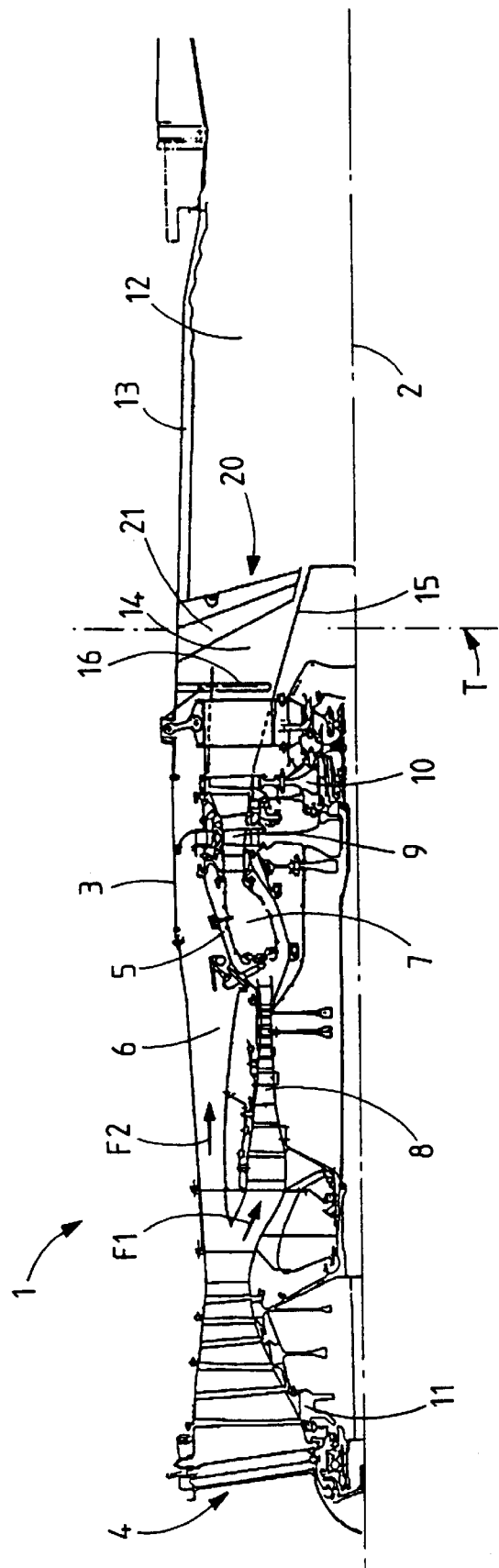
FIG. 1 is a half-axial section through a bypass turbojet engine fitted with an afterburn device in accordance with the invention.

The turbojet engine 1 shown in FIG. 1 has a general axis 2 of revolution and comprises an outer first wall 3 disposed coaxially around the axis 2 and extending from an upstream air intake 4 as far as a transverse plane T perpendicular to the axis 2. An inner second wall 5 is disposed coaxially around the axis 2 radially inwardly of the first wall 3 and cooperates therewith to define an outer annular closure 6. A combustion chamber 7 is disposed radially inwardly of the second wall 5 downstream from a high pressure compressor 8 and upstream of a high pressure turbine 9 followed by a low pressure turbine 10 which is arranged to drive a fan 11 disposed immediately downstream from the air intake 4. An afterburn chamber 12 is defined by a third wall 13 which is disposed coaxially around the axis 2 downstream of the first wall 3 and the second wall 5.

Air received by the air intake 4 is compressed by the fan 11 and is then divided by the inner second wall 5 into two flows, namely a primary flow F1 which participates in the burning of fuel in the combustion chamber 7, and a secondary flow F2 which flows through the outer enclosure 6. The primary flow F1 is compressed by the high pressure compressor 8 before entering the combustion chamber 7. The combustion gases issuing from the combustion chamber pass through the high pressure turbine 9 and the low pressure turbine 10 into an internal exhaust enclosure 14 which is defined between the second wall 5 and an inner cone 15 and which leads into the afterburn chamber 12. The second flow F2 also flows into the afterburn chamber 12 at the periphery thereof and serves to cool this chamber.

During reheat operation of the afterburn device some of the secondary flow F2 participates in the burning of additional fuel which is injected into the inner exhaust enclosure 14 just upstream of the afterburn chamber 12 by means of injectors 16 in the form of radial arms.

A flame arrester 20 consisting of a plurality of radial arms 21 is disposed in the transverse plane T downstream of the second wall 5, each radial arm 21 extending between the outer first wall 3 and the inner cone 15.

During dry operation, i.e. without reheat, each arm 21 has a low-drag, streamlined cross-sectional profile, which is symmetrical about an axial plane which contains the axis 2. The arm is relatively thick and the mid-portion of the profile is situated near the centre of the chord. For example, profiles of the NACA type, series 66 or 67 or 64, may be used.

Each arm 21 actually consists of two hollow parts, namely a fixed rear part 22 and a front part 23 which is separable from the rear part 22 along a median joint plane 24 disposed near the mid-portion of the profile.

The rear parts 22 of the arms are secured to the outer casing, either by way of the first wall 3 or by way of the third wall 13. Each rear part 22 has a substantially triangular cross-section defined by a forward frontal wall 25 and two side walls 26a, 26b which form a V with the apex pointing downstream.

The front parts 23 of the arms 21 are secured at their outer ends to a ring 26 which is rotatably mounted around the axis 2 in an internal groove 27 in the casing portion formed by the downstream end of the first wall 3. Each front part 23 has a substantially triangular cross-section defined by a rear wall 28 and two side walls 29a, 29b which form a V with the apex pointing upstream.

Figure 6:
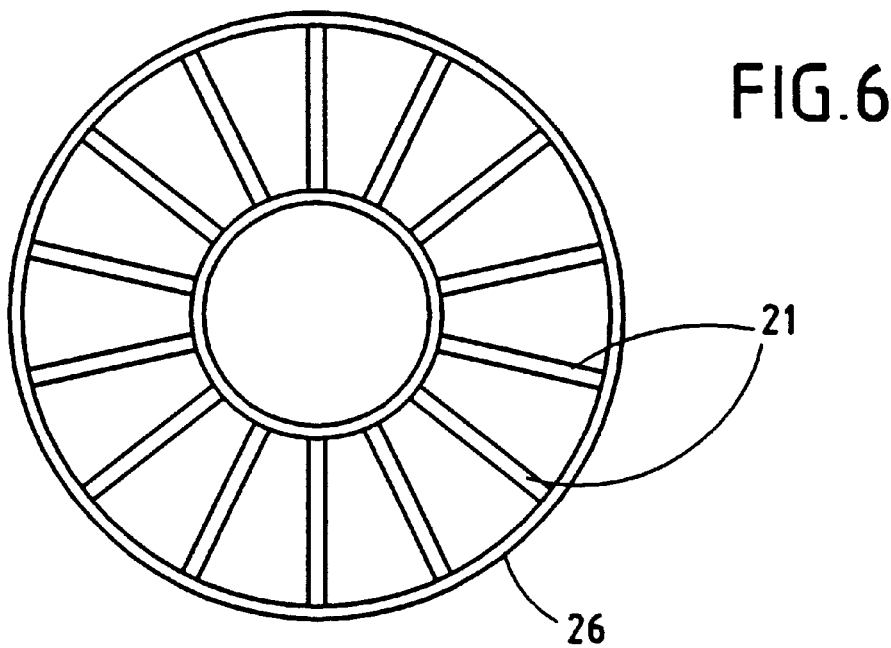
FIG. 6 is an axial view of the flame arrester during dry operation.
Figure 7:
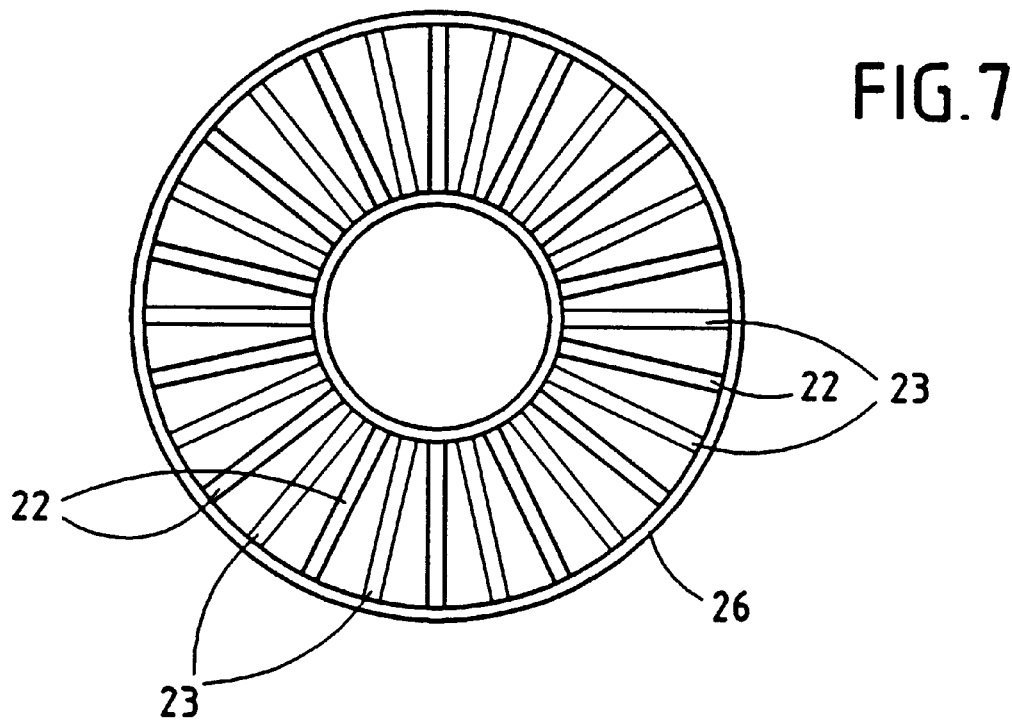
FIG. 7 is an axial view of the flame arrester during afterburn operation.

Drive means 30, which is described in detail hereinafter, is arranged to rotate the ring 26 between a first position, shown in FIGS. 2, 6 and 8, in which the front parts 23 of the arms 21 are disposed in front of and contiguously joined with the rear parts 22, and a second position which is shown in FIGS. 3, 4, 7 and 9 and in which the front parts 23 are separated from the rear parts 22 so as to alternate therewith in front of the joint plane 24. The first position is used for dry operation, and the second position is used for operation with reheat.

Figure 2:
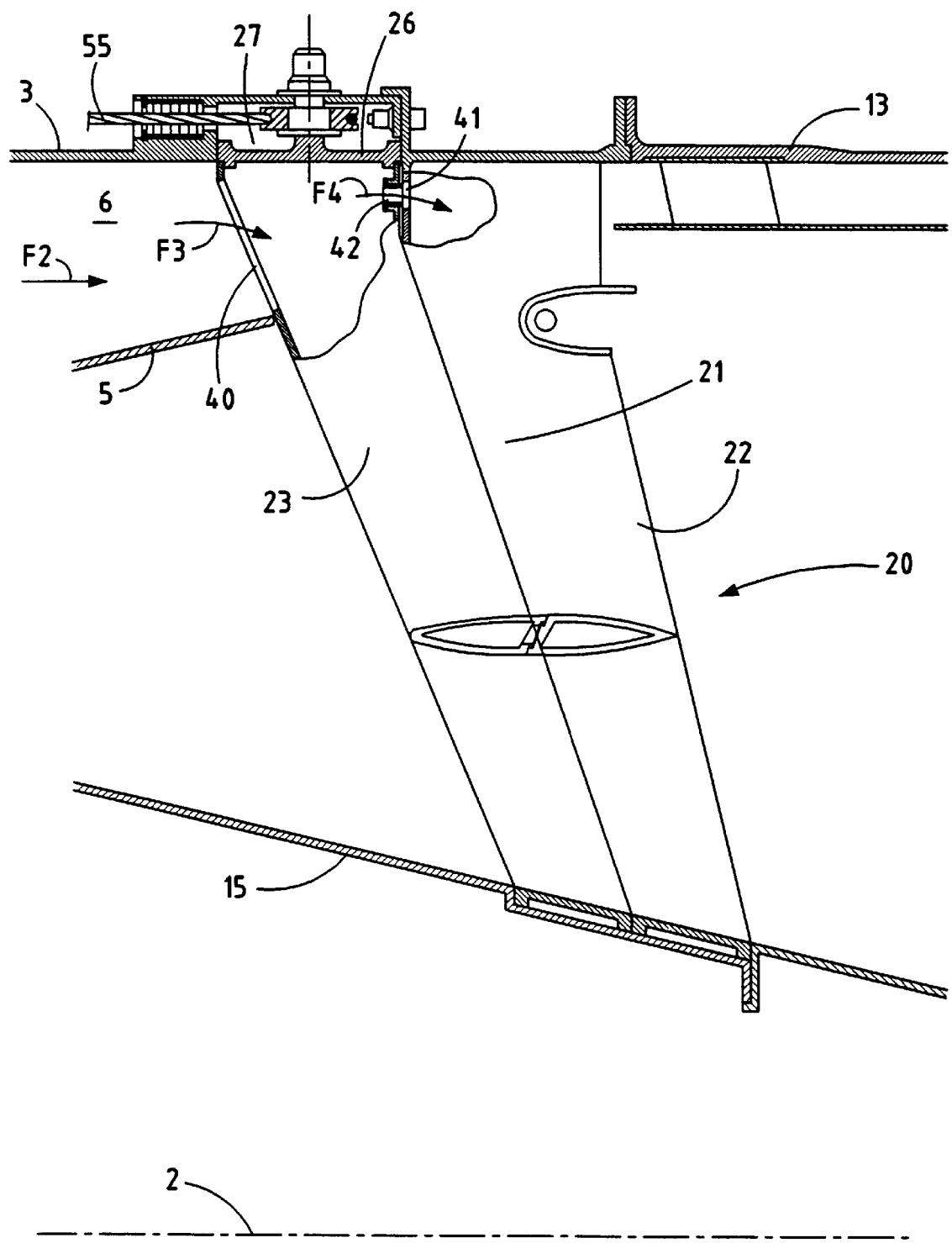
FIG. 2 is partly cut-away side view of a flame arrester arm of the afterburn device of FIG. 1 during dry operation.
Figure 3:
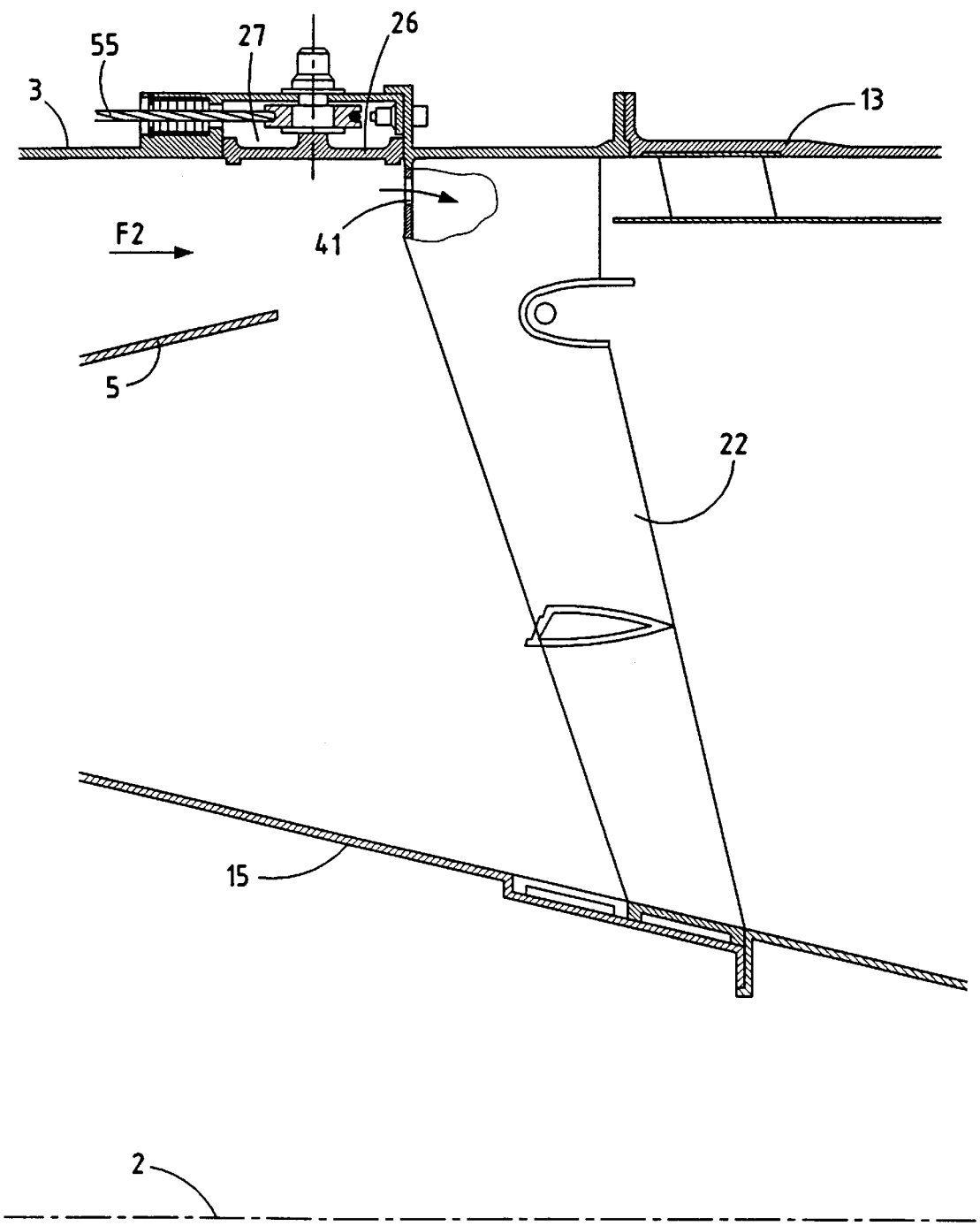
FIG. 3 is a partly cut-away side view of the rear part of the flame arrester arm of FIG. 2 during afterburn operation.
Figure 4:
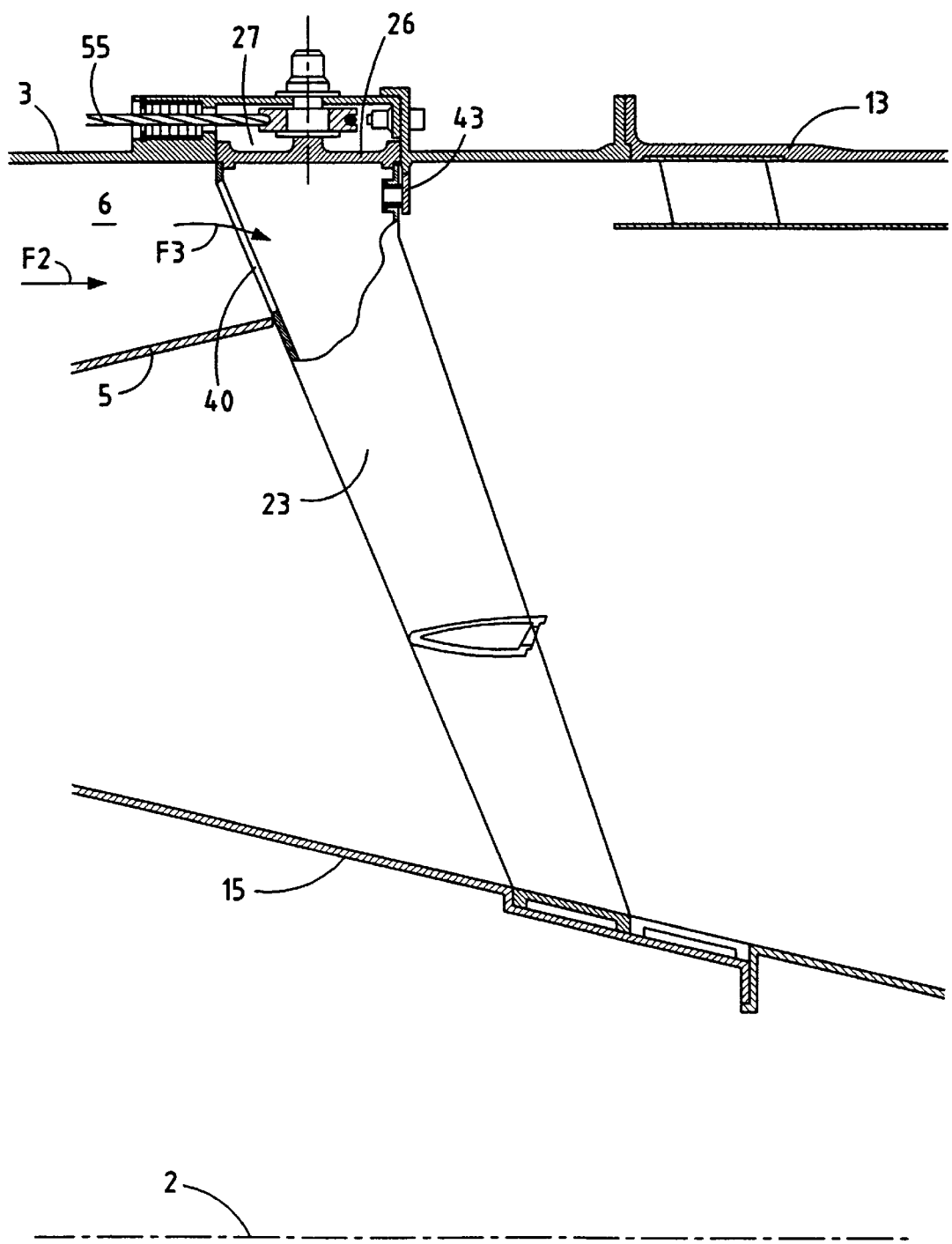
FIG. 4 is a partly cut-away side view of the front part of the flame arrester arm of FIG. 2 during afterburn operation.

As FIGS. 2 and 4 clearly show, a proportion F3 of the secondary flow F2 enters the interior of each front part 23 through a first orifice 40 which is formed in the upstream leading edge facing the outer enclosure 6.

During dry operation—i.e. when the ring 26 is in its first position, —a flow F4 enters the interior of each rear part 22 through a second orifice 41 which is formed in the front wall 25 of the rear part facing towards the outer enclosure 6, and which registers with a gauged third orifice 42 provided in the rear wall 28 of the aligned front part 23. Consequently, in dry operation a quantity F4 of air metered by the gauged third orifice 42 serves to cool the rear part 22.

The cross-section of the second orifice 41 is greater than the cross-section of the gauged third orifice 42 so that an increased amount of cooling air is able to enter the interior of the rear parts 22 when the front and rear parts of the arms are separated into the second position for afterburn operation. In the second position the gauged third orifices 42 of the front parts 23 are closed by fixed closure strips 43 disposed on the external casing, as shown in FIG. 4.

The rear walls 28 of the front parts 23 have two rows of orifices 45, 45 for the escape of cooling air which has entered the front parts 23 when the ring 26 is in its second position for afterburn operation. In the first portion for dry operation, however, the orifices 44 and 45 are closed by the front surfaces 25 of the rear parts 22.

Figure 5:
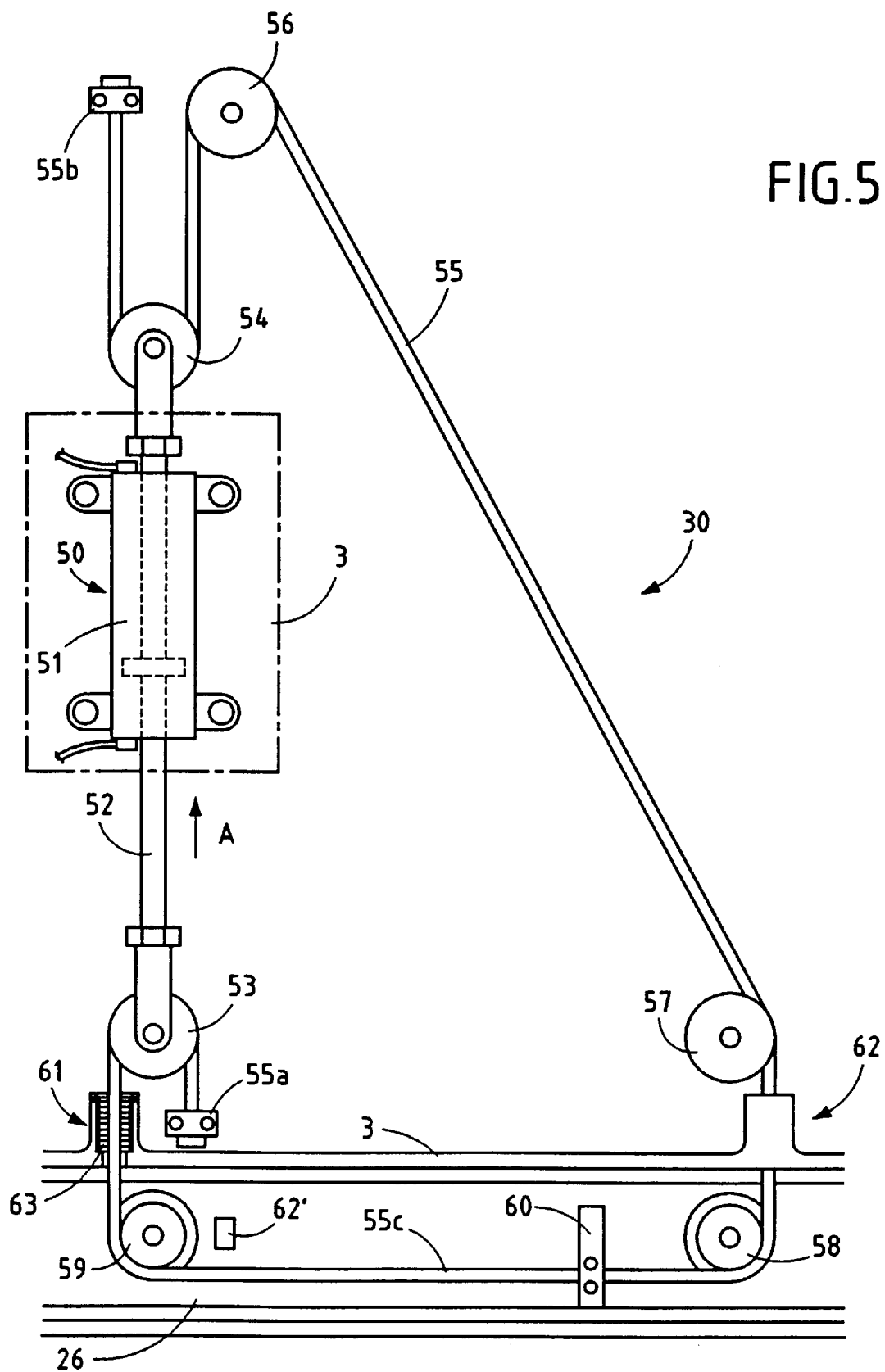
FIG. 5 shows one example of drive means for moving the front parts of the flame arrester arms relative to the rear parts.

FIG. 5 shows an example of drive means 30 for rotating the ring 26 in the groove 27 from its first position to its second position and vice versa. This drive means 30 basically comprises a double-acting ram 50 having a cylinder 51 secured to the outer first wall 3 and a piston rod 52 which extends through the end walls of the cylinder 51 and which has rollers 53, 54 at its opposite ends. These rollers engage and run on a cable 55 whose ends 55a, 55b are secured to the first wall 3. The cable 55 also runs around four direction-changing guide pulleys 56–59 which are disposed on the first wall 3 and form a pulley block which makes it possible to halve the travel of the rod 52. The pulleys 58, 59 are mounted in the groove 27 which houses and guides the ring 26, and the ring is secured by a lug 60 to the cable portion 55b which extends between the pulleys 58 and 59.

Apertures 61, 62 are provided in the side of the groove 27 for the cable 55 to pass through, and air-tight seals between the cable 55 and the walls of the apertures 61, 62 are provided by cylindrical cartridges 63 having brushes which rub on the cable. The brushes are made of a non-aggressive material, such as carbon.

Starting from the position shown in FIG. 5, in which the lug 60 rigidly securing the cable 55 to the ring 26 is disposed on the right and defines, for example, the first position of the ring 26 in which the front parts 23 of the arms 21 are disposed in front of and joined with the rear parts 22, the ring 26 is rotated to its second position by operating the ram 50 to move the piston rod 52 in the direction indicated by the arrow A so that the roller 53 pulls on the cable 55. The cable, which is rigidly secured to the ring 26 by the lug 60, thus rotates the ring in the groove 27 to the position 62'. In this second position the front parts 23 of the arms 21 are separated from and interleaved between the rear parts 22 in the manner shown in FIGS. 7 and 9.

This second position is used during afterburn operation. The front walls 25 of the rear parts 22 form unstreamlined obstacles which generate turbulence adapted to stabilise the flame. The rear walls 28 of the front parts 23 of the arms also create turbulence by a flat base effect and hence also help to stabilise the flame.

What is claimed is:

1. An afterburn device for a bypass turbojet engine defining a longitudinal axis of revolution and including an outer first wall disposed coaxially about said axis, an inner second wall which is also disposed coaxially about said axis and which together with said first wall defines an annular outer enclosure forming a secondary air flow duct, and an inner exhaust enclosure disposed inwardly of said second wall and separated thereby from said outer enclosure, said inner exhaust enclosure forming an exhaust duct for the escape of gases from the turbine stages of said engine, said afterburn device comprising a third wall disposed axially downstream of said first wall and said second wall to define an afterburn chamber which forms a downstream axial extension of said outer enclosure and said inner exhaust enclosure, and flame arrester means disposed between said afterburn chamber and said inner and outer enclosures, said flame arrester means comprising a plurality of substantially radial arms distributed evenly around said axis, each arm having a fixed rear part and a front part which is separable from said rear part along a median joint plane substantially perpendicular to said axis, a rotatable ring mounted for rotation about said axis at the downstream end of said first wall and to which the front parts of said arms are fixed, and drive means for rotating said ring about said axis between a first position, for dry operation, in which said front parts are joined with the rear parts of said arms and combine with said rear parts to provide said arms with streamlined profiles having low drag and zero angle of incidence, and a second position, for afterburn operation, in which said front parts are separated from said rear parts and alternate therewith circumferentially about said axis.

2. An afterburn device according to claim 1, wherein said front parts and said rear parts of said arms are hollow and comprise cooling systems for the flow of air from said secondary air flow duct.

3. An afterburn device according to claim 2, wherein said cooling system of each front part includes a first orifice in the upstream leading edge of said front part facing said outer enclosure, and said cooling system of each rear part includes a second orifice in its front wall facing towards said outer enclosure, the rear wall of each front part being provided with a gauged third orifice which registers with the second orifice in the corresponding rear part in order to supply said rear part with a portion of the cooling flow entering said front part when said rotatable ring is in said first position.

4. An afterburn device according to claim 3, wherein closure strips are provided for closing the third orifices of said front parts when said rotatable ring is the second position.

5. An afterburn device according to claim 3, wherein the cross-section of said second orifice is greater than the cross section of said third orifice.

6. An afterburn device according to claim 3, wherein said rear wall of each front part is provided with a plurality of further orifices for the escape of cooling air, said further orifices being closed by said front wall of the corresponding rear part when said rotatable ring is in said first position.

7. An afterburn device according to claim 1, wherein said drive means comprises at least one double-acting ram mounted on said first wall and having a piston rod extending through said ram, rollers at the opposite ends of said piston rod, a cable which extends around said rollers and has its opposite ends secured to said first wall, a plurality of guide pulleys mounted on said first wall and around which said cable also extends so that a portion of said cable runs substantially parallel to a tangent to said rotatable ring, and a lug connecting said portion of said cable to said ring.

* * * * *